E. SAVY.
MACHINE FOR COOLING CHOCOLATE AND OTHER MATERIALS.
APPLICATION FILED MAR. 1, 1919.
1,375,734.
Patented Apr. 26, 1921.
2 SHEETS—SHEET 1.
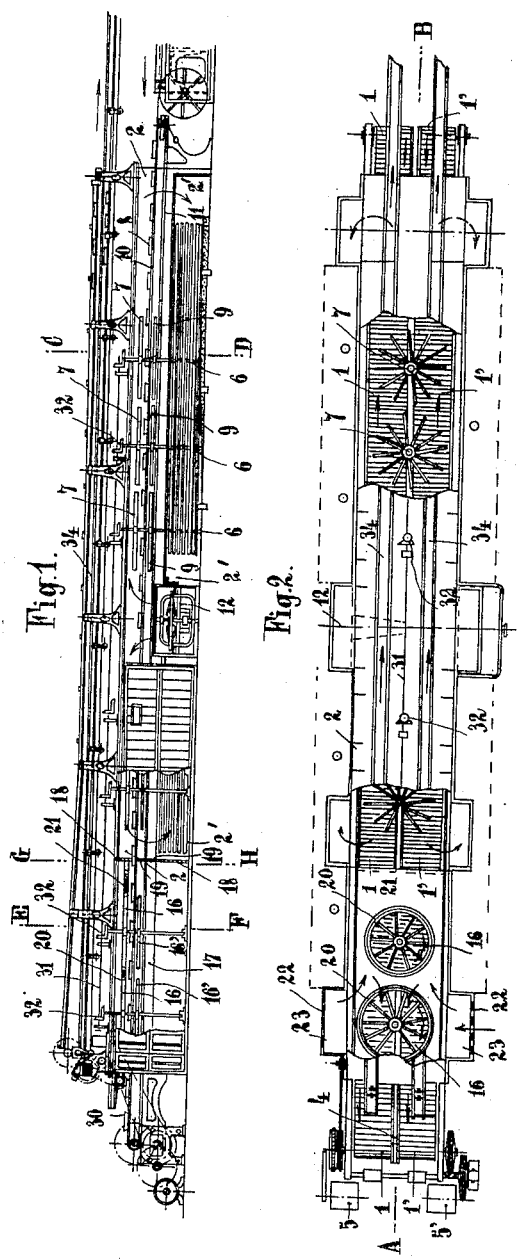
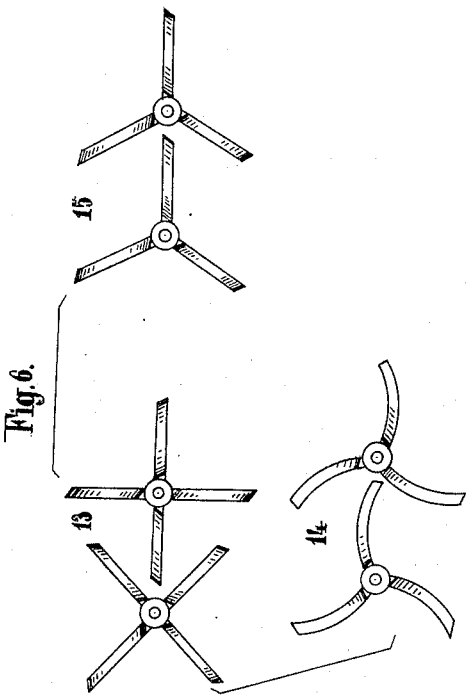

E. SAVY.
MACHINE FOR COOLING CHOCOLATE AND OTHER MATERIALS.
APPLICATION FILED MAR. 1, 1919.
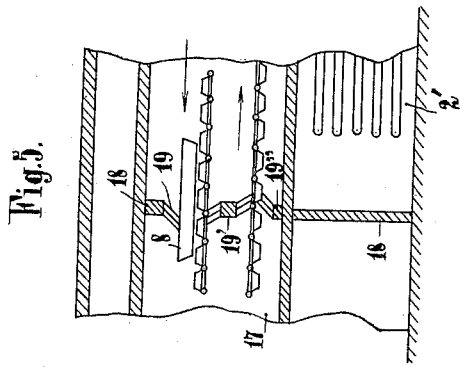
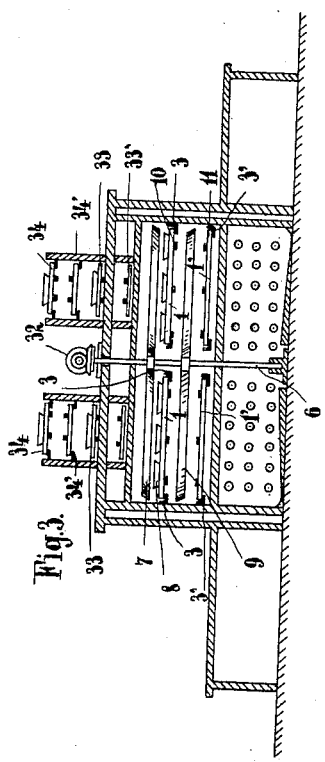
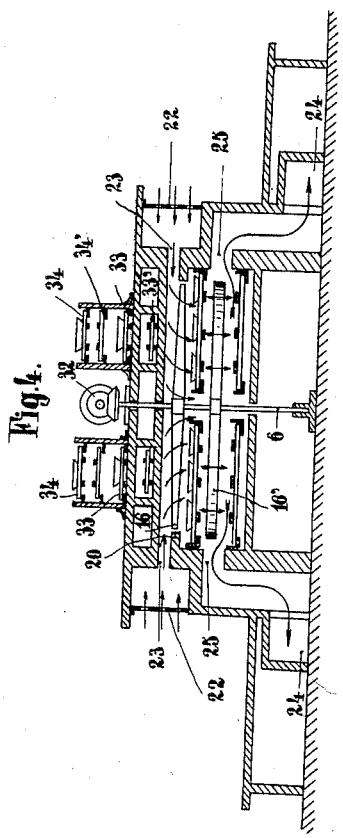

UNITED STATES PATENT OFFICE.

EMILE SAVY, OF PARIS, FRANCE.

MACHINE FOR COOLING CHOCOLATE AND OTHER MATERIALS.

1,375,734.  Specification of Letters Patent.  Patented Apr. 26, 1921.

Application filed March 1, 1919. Serial No. 280,173.

*To all whom it may concern:*

Be it known that I, EMILE SAVY, citizen of the Republic of France, and resident of Paris, France, (post-office address 5 Rue Denis Poisson,) have invented a new and useful Improvement in Machines for Cooling Chocolate and other Materials, which improvement is fully set forth in the following specification.

The present invention has for its object certain improvements in machines for cooling chocolate or other materials.

In order to render the explanations about to follow as clear as possible, the annexed drawing represents, by way of example, a machine for cooling chocolate provided with the improvements forming the subject matter of the present invention.

Figure 1 is a view in elevation of the machine.

Fig. 2 is a view in plan thereof.

Fig. 3 is a section, on a larger scale, on the line C—D of Fig. 1.

Fig. 4 is likewise a section, on a larger scale, on the line E—F of Fig. 1.

Fig. 5 is a section on the line G—H.

Fig. 6 shows several different forms and arrangements of fans which may be employed.

Machines for cooling chocolate, based upon the principle of endless transporters circulating in a current of cold air, are of limited width, because, the more this width is augmented, the more difficult it is to direct the current of cold air in order to make it play equally over all parts of the surface of the molds. Very irregular currents are set up which accelerate the cooling of certain points at the expense of the others. As a result there are produced on the surfaces of certain molds marblings which necessitate a percentage being remelted such percentage being sometimes considerable.

Now the possibility of widening the transporter is of very great importance when only very little room lengthwise is available, because there is gained on width what is lost in length, the output being naturally a function of the surface.

In order to obviate the disadvantages above indicated, and to permit in all cases of a practical installation, two or more transporters 1, 1' are coupled together in the same cooling chamber 2. These transporters 1 and 1', (generally constituted by laths of wood or metal fixed to chains at short distances from each other in order to permit of the circulation of air) are supported and slide on longitudinal brackets 3. (See Fig. 3.) These transporters are separated from each other by a short distance, leaving between them an empty space 4. Between these two transporters which may have different speeds imparted to them, by means of the motors 5 and 5' (see Fig. 2,) are placed vertical shafts 6 upon which are keyed horizontal vanes, more or less inclined (see Fig. 6) forming fans 7.

It will be noted, on examining Figs. 1 and 3, that one of these fans 7 is of large surface occupying the whole of the width of the two transporters, and is placed above the molds 8 circulating in the direction of the arrow, and that another fan 9, exactly similar, keyed a little lower down on the same shaft, is placed between the surfaces 10 and 11 of the transporters 1 and 1' just below the molds.

If the motor 30 which drives the shaft 31 (see Fig. 1) is set in motion, it can cause the fans 7 to rotate more or less rapidly through the medium of bevel wheels 32. These fans energetically agitate the cold air set into the circuits from right and left by the central fan 12 and, in consequence of the inclination of their vanes, spread it out perfectly forcing it to play uniformly above and below the molds in a regular manner over their entire surface. The result is a uniform cooling for all the molds and a more perfect utilization of the cold air, which is shown by an augmentation of the output, and the suppression of remeltings. The fan 12 is located intermediate the ends of the refrigerating chamber 2' located below chamber 2 and has its intake side in communication with the latter. Air enters the chamber 2' at opposite ends as indicated in Figs. 1 and 2, and is drawn to fan 12 and expelled into the upper chamber 2 at points intermediate its ends, the air currents dividing and traveling in opposite directions to the ends of the chamber. The ends of chamber 2 communicate with the corresponding ends of chamber 2', as indicated in Figs. 1 and 2.

The inventor reserves the right to give to the vanes of the horizontal fans, not only the forms 13, 14 and 15 given in Fig. 6, but also all other forms, with any number of blades that practice shall demonstrate to be efficacious. In like manner, in place of putting the fans at a distance from each other, there will be an advantage in letting them overlap each other as in Fig. 6.

By means of this combination, it will be seen that the molds travel between two series of fans, one above and one below, and this arrangement, combined with the possible change of speed of each transporter, permits, in the same machine and at the same time, the treatment of molds of different weights which are susceptible therefore of remaining a different lapse of time in the machine, which is of great importance.

It is to be understood that each transporter may have associated with it, transporters 33 and 34, for carrying away from the machine full and empty molds, as more particularly disclosed in U. S. Letters Patent No. 941,537 granted November 30, 1909, to Alfred H. Savy.

An important feature of the invention consists in the adjustment of the temperature of the molds to the surrounding temperature of the room in which the molds are removed prior to leaving the machine in order to avoid all condensation on the cakes. To this end, in continuation of the cold chamber 2, there is placed a second chamber 17, by constructing a partition wall 18 the hermeticity of which is insured on the passage of the surfaces of the mold transporters 1 and 1' by flexible brushes 19, 19', 19'' (see Fig. 5) passing through the axis of the partition wall 18. In this chamber as in the cold chamber 2, fans are arranged above and below the molds but with a modification.

This modification consists in fitting the upper fans 16 (see Fig. 1) into the ceiling 21 of the chamber 17, and the vanes are inclined in such a way that the fans draw in the surrounding air of the room through the openings 22 and 23. (See Fig. 4.) This air, forced into the surface of the molds is retaken by the lower fans 16' with reversed vanes in order to create a strong eddy; it is finally expelled through the openings 25 into the lower passages 24 in communication with the room in which the molds are removed.

The molds issuing from the cold chamber are subject to a violent current of air at the surrounding temperature: they are rapidly brought back to this temperature and all condensation is avoided.

What I claim and desire to secure by Letters Patent of the United States is:—

1. In apparatus of the class described, a casing, a source of cooled air communicating with said casing intermediate the ends thereof, means for drawing cooled air into said casing through the source of supply therefor, two conveyers mounted to travel side by side in said casing, a series of upstanding drive shafts between the two conveyers, and fans on each shaft arranged above and below the conveyers and each serving to agitate the air about both conveyers.

2. In apparatus of the class described, a casing, two mold conveyers mounted to travel side by side therein, means for forcing cooled air into said casing, and a series of fans above and a series of fans below the mold conveyers, the fans of both series rotating in planes parallel to the conveyers to distribute the air with substantial uniformity over the molds thereon, each fan serving for both conveyers and having its axis of rotation intermediate them.

3. In apparatus of the class described, a casing having a cooling chamber, means for drawing cooled air into said chamber, conveying means to carry articles through said chamber, a tempering chamber provided in said casing through which the articles are carried from the cooling chamber before emerging from said casing, and means associated with the tempering chamber to gradually adjust the temperature of the articles during their transition to that existing outside the chamber.

4. In a cooling apparatus a plurality of endless transporters for the materials to be cooled, means for driving said transporters at different speeds, means for causing cooling air to circulate in said apparatus, comprising a plurality of horizontal fans located above and below said transporters and common driving means for the fans, substantially as and for the purpose described.

5. In a cooling apparatus a pair of endless transporters for the materials to be cooled arranged side by side with a space between them, means for forcing cooling air within said apparatus, a vertical shaft, a horizontal fan mounted on said shaft above said transporters, a second horizontal fan mounted on said shaft between the runs of said transporters, and means for rotating said shafts, substantially as and for the purpose described.

6. In a cooling apparatus a pair of endless transporters for the materials to be cooled arranged side by side with a space between them, means for forcing cooling air into said apparatus, a vertical shaft, a horizontal fan of large surface occupying the whole of the width of the two transporters, mounted on said shaft above said transporters, a second horizontal fan of large surface occupying the whole of the width of the two transporters, mounted on said shaft between the runs of said transporters and means for rotating said shafts, substantially as and for the purpose described.

7. A cooling apparatus comprising a cooling chamber, means for forcing cooled air into said chamber, a plurality of transporters for the materials to be cooled, driving means for said transporters, a plurality of horizontal fans located above and below said transporters for distributing the cooled air, means for driving said fans, a temperature adjusting chamber adjacent the cooling chamber and means for causing air at the surrounding temperature of the room in which the materials are removed to circulate in said chamber, substantially as and for the purpose described.

8. A cooling apparatus comprising a cooling chamber, means for forcing cooling air into said chamber, a plurality of transporters for the materials to be cooled, driving means for said transporters, a plurality of horizontal fans located above and below said transporters for distributing the cooled air, means for driving said fans, a temperature adjusting chamber adjacent the cooling chamber, a plurality of horizontal fans in said temperature adjusting chamber for causing air at the surrounding room temperature to circulate in said chamber and common driving means for all said fans, substantially as and for the purpose described.

In testimony whereof I have signed this specification.

EMILE SAVY.